Figure 1:
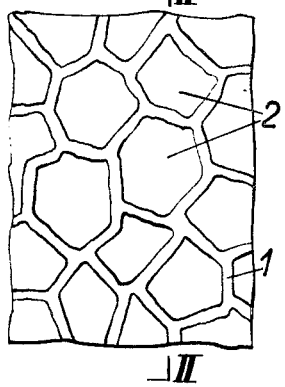

March 1, 1966 — R. NIKOLL — 3,238,031
SHAPING METHOD AND APPARATUS FOR FORMING PANEL WHICH EXHIBITS OPTICAL EFFECTS
Filed May 9, 1962 — 3 Sheets-Sheet 1

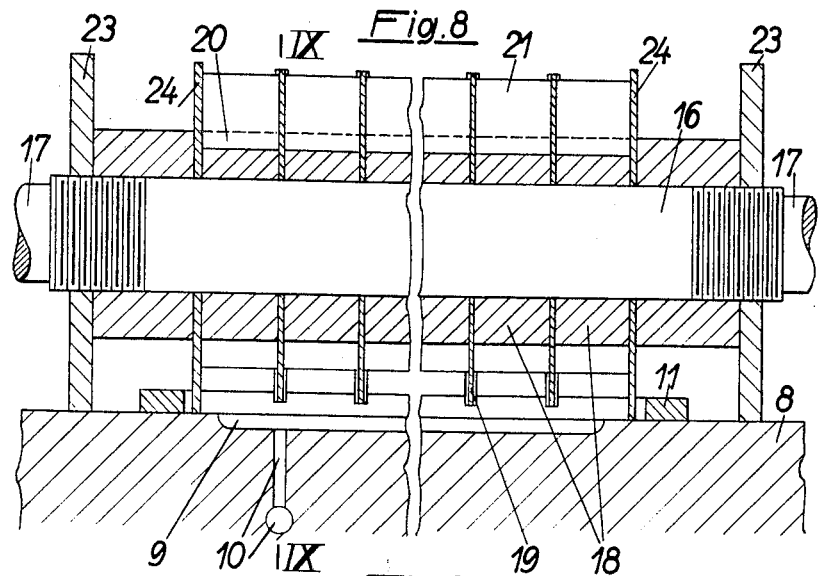
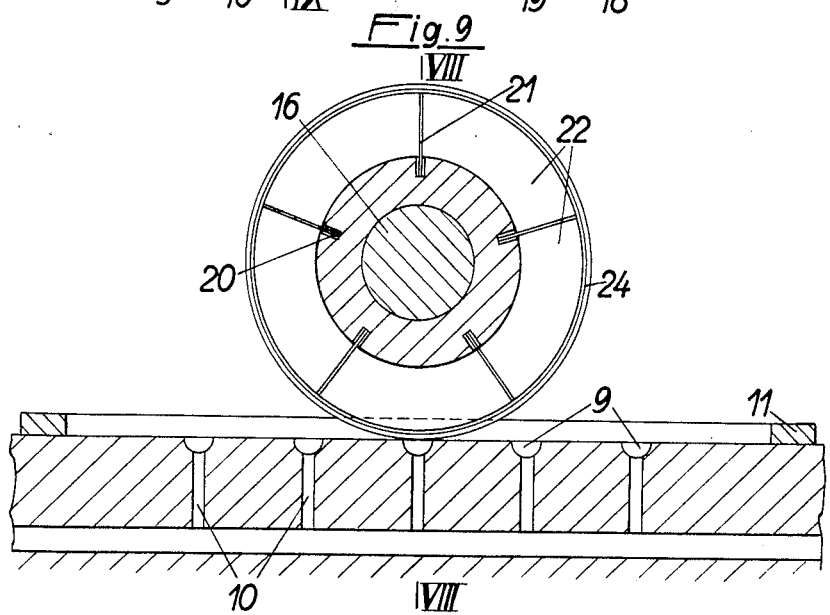

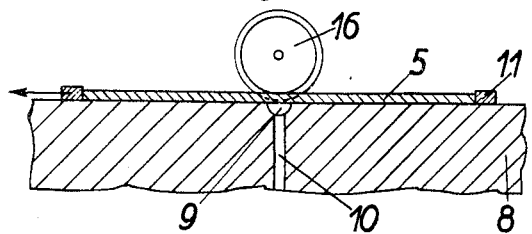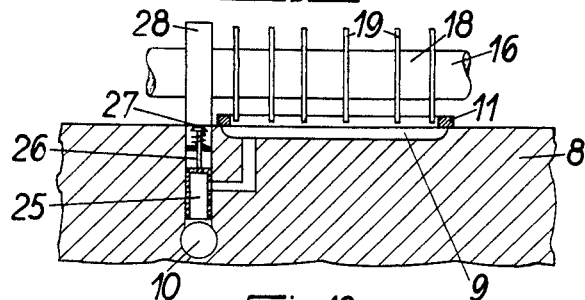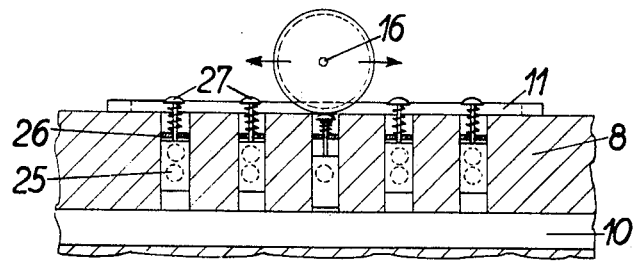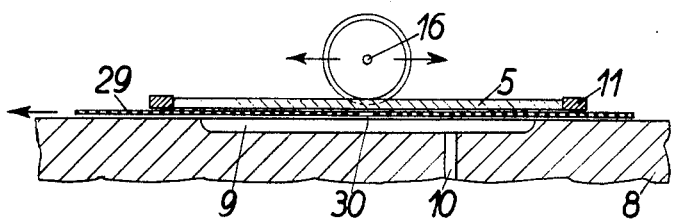

United States Patent Office 3,238,031
Patented Mar. 1, 1966

3,238,031
SHAPING METHOD AND APPARATUS FOR FORMING PANEL WHICH EXHIBITS OPTICAL EFFECTS
Rupert Nikoll, Weyrgasse 5, Vienna III, Vienna, Austria
Filed May 9, 1962, Ser. No. 193,571
Claims priority, application Austria, May 15, 1961,
A 3,817/61
10 Claims. (Cl. 65—94)

This invention relates to a panel which exhibits optical effects, particularly a cover panel for light sources, which panel is made preferably from glass, and has a surface with projections and a fire finish at least adjacent to the projections.

Such panels, particularly of glass, have been known for a long time. They are manufactured on a large scale, for example, in the workshops at Murano, Italy. In the process used there, the desired surface profile is obtained by manually impressing sheet metal molds similar to pastry cutters into a plastically deformable material which is spread on an appropriate base. Only persons having great experience and skill are employed in the manufacture. Even when these requirements are fulfilled, however, the amount of rejects in manufacture is relatively large. For this reason and owing to the handicraft methods of manufacture, such panels are highly expensive.

It has been proposed to introduce a hot glass composition in a frame lying on a flat base plate and to smooth the glass composition to uniform thickness, then to remove the upper frame part and impress a pattern with the aid of a pressure grate so that the protruding portions of the grate bear on the lower part of the frame to ensure the desired, uniform depth. This process has the disadvantage that the size of the panels being manufactured is determined by the size of the pressure grate so that a separate pressure grate is required for each size of panel. The process is also expensive because pressure grates of various sizes must be kept in stock for each pattern. This disadvantage may be eliminated if the pressure grate is replaced by a molding roller, which is moved at such a distance from the base that the profile portions protruding from the surface of the roller penetrate only partly into the plastically deformable material and cause the material laterally displaced thereby to bulge into the cavities between the protruding profile portions of the roller without contacting the roller surface. This enables the manufacture of panels of any desired length.

All panels manufactured by these processes, however, have the disadvantage that their manufacture permits providing them with a fire finish only on one side so that the light-diffusing and light-refracting effects of these panels, i.e., the optical effects exhibited by them, are not entirely satisfactory. In such panels having protruding profile portions a special luster may be obtained according to the invention if the projections consist of bulges which are formed directly out of the deformable material and have a fire finish on both sides, and which have in their protruding portion, particularly at their apex, a reduced wall thickness to promote the diffusion of light.

The invention provides also a process of manufacturing such panels, in which a mold cooperates with the material which is applied in a deformable condition in substantially uniform thickness on a base. According to the invention the deformable material is spread on a base which is provided with outlet openings for a gaseous fluid and preferably with a frame, whereafter the mold is disposed opposite to the surface of this material and the deformable material is blown and/or sucked with the aid of a pressure fluid into cavities between the protruding profile portions of the mold to form bulges in the cavities between the profile portions of the mold which are directly bulged out of the material and have a fire finish on both sides. The bulges may be blown out of the deformable material by supplying compressed air through the outlet openings of the base plate.

According to another proposal of the invention, the profile of the panel is formed with the aid of a molding roller which is moved over the base so that the profile portions protruding from the roller penetrate only partly into the material spread in a surface on the base, and the underside of the material to be deformed is subjected to the action of a gaseous pressure fluid in dependance on the movement of the roller.

The material spread in a surface on the base may alternatively be pulled between the molding roller rotatably mounted in a stationary position and the base plate which is disposed below this roller and is provided with a groove which extends parallel to the axis of the roller and serves for supplying the pressure fluid. Valves for controlling the escape of the gaseous presure fluid from grooves parallel to the axis of the roller may be controlled in dependence on the position of the molding roller moved over the base. Finally, the plastically deformable material may be spread on a surface of a bottom plate which lies on the base and is formed with a slot parallel to the roller axis, whereafter the bottom plate is moved together with the molding roller over the base in the same direction and at the same speed as the roller, while gaseous pressure fluid is constantly fed to the slot in the bottom plate through a longitudinal groove formed in the base. The roller may be used to cut at least one longitudinal edge of the panel in known manner simultaneously with the formation of the bulges in the profiled panel.

This invention relates also to apparatus for carrying out the process according to the invention, which apparatus comprises a base on which the deformable material may be spread and a mold disposed opposite to this base, and which is characterized in that the base is provided with at least one opening, which is connected by a duct to a source of a gaseous pressure fluid, and that the mold is adapted to be disposed at a predetermined distance above the base and is capable of being fixed in this position. The grid-shaped mold or at least parts thereof may form wall portions of a vacuum chamber connected to a vacuum pump. The mold may consist of a molding roller and be provided at both ends with guide discs for establishing the distance of the roller from the base and the depth which the profile portions of the molding roller penetrate into the deformable material during the rolling operation. The base may be formed with groove-shaped openings for the gaseous fluid, which openings are suitably evenly spaced and parallel to the axis of the roller. The molding roller may be rotatably and vertically adjustably mounted in a fixed position above a groove-shaped opening formed in the base and provided with a stripper or hold-down member for the deformable material, which material is disposed in a frame which is slidable on the base. According to the invention, groove-shaped openings provided in the base may be provided with shut-off valves, which have actuating members protruding above the surface of the base the molding roller being provided with a disc which contacts the base and serves for successively actuating these valves. Finally, the invention provides an apparatus which comprises a bottom plate formed with a slot parallel to the axis of the roller and disposed between the stationary base and the deformable material, the slot in the plate being disposed below the roller, said roller and bottom plate being adapted to be moved together in the same direction and at the same speed whereas the deformable material is held in position by means of a frame or the like.

Figure 2:
Figure 3:
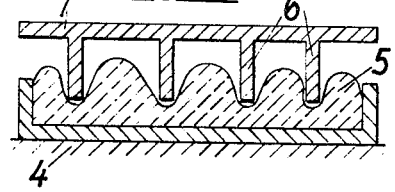
Figure 7:
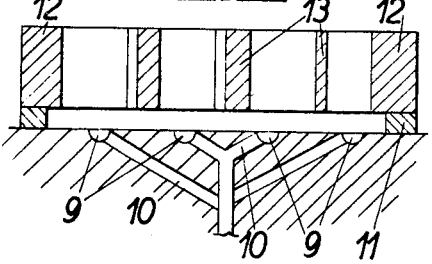
Figure 6:
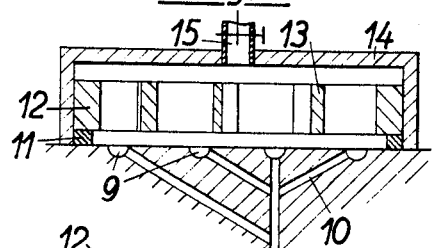
Figure 5:
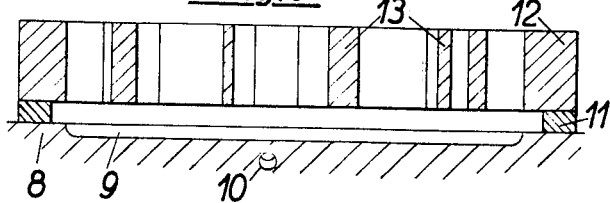
Figure 4:
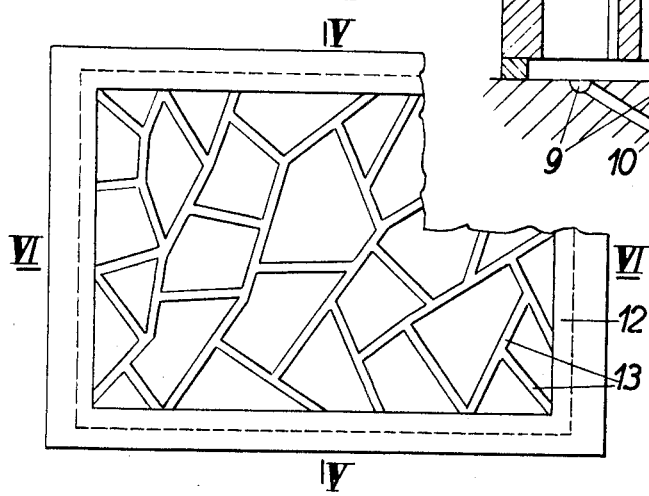

The invention will be explained more fully hereinafter with reference to illustrative embodiments shown on the accompanying drawing, in which FIG. 1 is a diagrammatic elevation view showing a panel according to the invention, FIG. 2 is a sectional view taken on line II—II in FIG. 1, FIG. 3 is a diagrammatic representation of the previous method of manufacturing the panels, FIG. 4 is a top plan view showing a platelike mold placed on a mold frame, FIG. 5 is a sectional view taken on line V—V in FIG. 4, FIG. 6 is a sectional view taken on line VI—VI in FIG. 4, FIG. 7 is in a diagrammatic view of a platelike mold in conjunction with a vacuum chamber, FIG. 8 is a longitudinal sectional view taken through a molding roller which is moved at a distance from the base plate, FIG. 9 is a section taken on line IX—IX in FIG. 8, FIG. 10 is a diagrammatic view showing a molding roller rotatably mounted above a groove formed in the base plate, which groove is parallel to the axis of the roller, FIG. 11 is a diagrammatic front elevation showing partly in section an apparatus in which the grooves in the base plate are formed with shut-off slide valves and the molding roller is arranged to operate these valves, FIG. 12 is a side view of the apparatus of FIG. 11, and FIG. 13 is a diagrammatic view showing an apparatus provided with a bottom plate which is disposed between the deformable material and the stationary support and is jointly movable with the molding roller in the same direction.

The panel 1 shown in FIGS. 1 and 2 is provided with bulges 2, which bulge directly from the deformable material and have a fire finish on both sides. The bulges 2 are of diminishing thickness and particularly at their apexes 3, have reduced wall thickness to promote the diffusion of light. The shape and extent of the bulges may vary within a wide range. It is not necessary to provide such bulges throughout the panel. The panels according to the invention are particularly suitable as cover plates for light sources and may be assembled in configurations which can be made only with difficulty as integral bodies to form covers for large light sources.

FIG. 3 shows basically the known manufacture of the panels, in which a grate or a profiled roller is forced to a predetermined depth into the deformable material 5 spread in a surface on a base plate 4 so that the grate or roller causes the material displaced by the bars 6 of the grate to bulge in the cavities between the bars without contacting the carrier plate 7 of the grate. As a result, the fire finish of the bulges is preserved. As has been mentioned hereinbefore, the panels made by this known process have the disadvantage of having a fire finish only on one side and resemble lustrous pressed glass because the bulges have an almost uniform height.

The embodiment of an apparatus for carrying out the process according to the invention shown in FIGS. 4 to 6 comprises a base in the form of a base plate 8, which is formed in its top surface with a plurality of groove-shaped openings 9, which communicate through ducts 10 with a source of compressed air, not shown. A mold frame 11 placed on the base plate 8 serves for receiving the deformable material and for determining its thickness. A platelike mold 12 having a grid structure is tightly placed on this mold frame. The mold 12 is preferably assembled from flat iron bars 13 placed on edge. When in such an apparatus compressed air or the like, is supplied from a source through the ducts 10 to the openings 9 and caused to act on the underside of the material to be deformed, the same will be urged into the cavities between the grid bars 13 of the mold 12 to form bulges in such cavities, which bulges are characterized not only by excellent light-diffusing and light-refracting effects owing to the fire finish on both sides but also by a desired irregularity thereby imparting to the panels an artistic character.

The wall thickness of the bulges may be reduced, particularly at the apex, by the selection of an appropriate thickness of the layer of the spread material, the depth of penetration of the mold, the blowing pressure applied and its controlled application, and the temperature of the material. In this way the bulges may be formed to exhibit the effect of a divergent lens, which further increases the optical effect achievable with such panels.

In the apparatus diagrammatically shown in FIG. 7, the mold 12 forms a wall of a vacuum chamber 14 and the predominating internal pressure causing the deformable material to bulge is caused by evacuating the vacuum chamber 14 through an opening 15 thereof.

Instead of a platelike mold, the apparatus shown in FIGS. 8 and 9 uses a molding roller, which comprises an axially extending mandrel 16 having screw-threaded ends 17 and carrying discs 19 separated by spacers 18. The discs 19 may, for example, have a corrugated rim and are replaceable to produce different patterns. In the present case the spacers 18 consist of sleeves, which are smaller in external diameter than the discs 19 and are provided with recesses 20 for inserting radially extending profile sections 21 consisting of crossbars. The present embodiment comprises five rows of such evenly spaced profile sections 21. The discs 19 and the transverse profile sections 21 consist preferably of sheet metal having a thickness of 1 to 3 mm. The edge of the profile sections 21 may also have fine corrugations. If desired, the roller may be provided with an entirely irregular mold pattern. Guide discs 23 are provided at both ends of the molding roller to space the roller from the deformable material by a distance which enables the same to bulge freely in the cavities 22 between the protruding profile portions of the roller and at the same time determine the depth of penetration of the mold. The guide discs 23 have internal screw threads and are in threaded engagement with the ends 17 of the mandrel 16 so that the discs 19 and spacers 18 fitted on the mandrel 16 are firmly held between the discs 23. Close to their ends the molding roller is provided with cutting discs 24, which trim the lateral longitudinal edges of the panel strip while the mold is urged into the deformable material. The panel strip formed by the continuous movement of the molding roller over the deformable material 5 of uniform thickness in the mold frame 11 can be cut into equal lengths if the roller is provided with a least one knife, which extends throughout the length of the roller as far as the lateral cutter discs 24 or the profile sections 21 of one row may be so high that they penetrate into the deformable material to the same depth as the lateral cutter discs 24 to sever the panel sections along transverse lines.

In the apparatus diagrammatically shown in FIG. 10, the molding roller is rotatably mounted in a stationary position, preferably so as to be vertically adjustable, above a groove-shaped opening 9 which is formed in the base plate 8 and extends parallel to the shaft 16 of the roller. The roller may cooperate with a stripper, if desired. In this embodiment the deformable material 5 spread in a surface on the base plate 8 in a mold frame 11, is pulled between the base plate 8 and the roller.

In the apparatus diagrammatically shown in FIGS. 11 and 12, the groove-shaped openings 9 formed in the base plate 8 are provided with spring-loaded shut-off slide valves 25, which are controlled by the molding roller in dependence on the position of the latter. For this purpose, each shut-off valve 25 is provided with an actuating pin 26 which extends to the surface of the base plate 8 and the free end of which carries an actuating button 27 which protrudes from the base plate 8. The molding roller is provided at one end with a disc 28, which contacts the base and successively depresses the buttons 27 to open the respective valves 25 during the rotation of the disc 28.

The apparatus shown in FIG. 13 comprises a bottom plate 29 disposed between the deformable material 5 and the base plate 8 and having a slot 30. A molding roller disposed vertically over the slot can be moved together with the bottom plate 29 in the same direction and at the same speed whereas the deformable material 5 is held in position by a frame 11. Compressed air is constantly fed through the longitudinal groove 9 in the base plate to the slot 30 in the bottom plate.

Materials suitable for panels formed according to the invention include transparent, colorless or colored or coated glass, as well as translucent homogenous or coated glasses and all similarly deformable plastics having equivalent optical properties. The optical effect due to the refraction and/or diffusion of light may be varied in many ways by providing the bulges in appropriate shapes and arrangements. More particularly, where translucent materials are used, the exit of light through rim portions of the bulges may be promoted.

What is claimed is:

1. A method for manufacturing a light-transmitting panel with a surface which produces optical effects, said method comprising applying a differential pressure to the opposite surfaces of a deformable layer of light-transmitting material while contacting one of the surfaces of the layer at a plurality of spaced locations along said one surface, said differential pressure being of a magnitude to cause said layer to freely bulge between said locations and form convex bulges, said differential pressure being maintained for a period of time sufficient for the layer to cool and form fire polish on both surfaces thereof at the bulges while at said locations the layer is prevented from bulging.

2. A method for manufacturing a light-transmitting panel having a surface which produces optical effects, said method comprising spreading light-transmitting material in a deformable state in the form of a layer of substantially equal thickness onto a base which is provided with perforations adapted for the passage of a gaseous medium therethrough, positioning a mold having a number of hollow spaces separated by protruding profile portions opposite said layer such that the profile portions are adjacent the layer, establishing a pressure difference in the area of at least a number of the hollow spaces of the mold between both sides of the layer to cause said layer to project into said hollow spaces and form bulges therein which are free to contact with the mold except at the lower ends of the profile portions until the layer has cooled sufficiently to form a fire polish on both surfaces of the layer at said bulges.

3. Apparatus for manufacturing a panel of light-transmitting deformable material having a surface which produces optical effects, said apparatus comprising a base having an upper surface adapted to support light-transmitting material in a plastically deformable state in the form of a layer of substantially uniform thickness, a mold including protruding profile portions and cavities between said profile portions which are open at top and bottom, means for supporting said mold at a fixed level relative to said base such that the upper surface of the base is in facing relation with said profile portions and cavities, said profile portions being spaced above said upper surface, and means for creating a differential fluid pressure on the opposite surfaces of the layer such that the differential pressure causes the layer of light-transmitting material to freely project into said cavities without contacting the mold and form bulges having fire polish on both sides thereof.

4. Apparatus as set forth in claim 3, in which said base is provided with an opening and a duct communicating with said opening and adapted to supply a gaseous pressure fluid to said opening.

5. Apparatus as set forth in claim 3, in which said protruding profile portions form a grid and at least part of said cavities communicate with a vacuum source.

6. Apparatus for manufacturing a panel of light-transmitting deformable material having a surface which produces optical effects, said apparatus comprising a base having an upper surface adapted to support light-transmitting material in a plastically deformable state in the form of a layer of substantially uniform thickness, a rotatable roller constituting a mold for said material, said roller including radial projecting profile portions and cavities between said profile portions, means supporting the roller in spaced relation from the base, means for establishing differential pressure betwen the surfaces of the layer to cause said layer to freely project into said cavities and form bulges which do not contact the mold and have fire polished opposite surfaces, and means for providing relative movement between the layer and the roller to enable a continuous length of the layer to be formed with said bulges.

7. Apparatus for manufacturing a panel of light-transmitting deformable material having a surface which produces optical effects, said apparatus comprising a base having an upper surface adapted to support light-transmitting material in a plactically deformable state in the form of a layer of substantially uniform thickness, a mold comprising a molding roller including profile portions and cavities between said profile portions, said roller having opposite ends and including at said ends spacing discs larger in diameter than said roller, said discs being in contact with said base to establish the distance of said roller from said base and to place said upper surface of the base in facing relation with said profile portions and cavities with said profile portions spaced above said upper surface, said base being provided with at least one opening, and means for creating a differential fluid pressure adjacent said opening such that the differential pressure causes the layer of light-transmitting material to freely project into said cavities without contacting the mold and form bulges having fire polish on both sides thereof.

8. Apparatus as set forth in claim 7, in which a plurality of said openings are provided in the form of substantially evenly spaced grooves extending along the roller.

9. Apparatus for manufacturing a panel of light-transmitting deformable material having a surface which produces optical effects, said apparatus comprising a base having an upper surface adapted to support light-transmitting material in a plastically deformable state in the form of a layer of substantially uniform thickness, a mold comprising a molding roller including profile portions and cavities betwen said profile portions, said roller having opposite ends and including at said ends spacing discs larger in diameter than said roller, said discs being in contact with said base to establish the distance of said roller from said base and to place said upper surface of the base in facing relation with said profile portions and cavities with said profile portions spaced above said upper surface, said base being provided with a plurality of openings, means for creating a fluid pressure adjacent said openings and means for supporting said roller for movement along said base at a fixed level relative to said base such that the pressure causes the layer of light-transmitting material to freely project into said cavities without contacting the mold and form bulges having fire polish on both sides thereof, said apparatus further comprising in each opening a normally closed shut-off valve including an actuating member normally protruding above said base and depressible to open said valve to enable a discharge of a gaseous pressure fluid through said opening, said roller being movable relative to said base along a predetermined path and a further disc on said roller arranged to successively depress said actuating members as said roller is moved relative to said base along said path.

10. Apparatus for manufacturing a light-transmitting panel having a surface which produces optical effects, said apparatus comprising a base having an upper surface adapted to support light-transmitting material in a plastically deformable state in the form of a layer of substantially uniform thickness, a mold comprising a molding roller including profile portions and cavities between said profile portions, said roller having opposite ends and including spacing discs larger in diameter that that of the roller at said ends, said discs being in contact with said base to maintain the roller in spaced relation above the upper surface of the base while placing said profile portions and cavities in spaced facing relation with the upper surface of the base, said upper surface being provided with at least one opening, and means for creating a fluid pressure adjacent said opening and including a groove in the base extending transversely to the axis of said roller, a bottom plate disposed between and movable relative to said base and said layer and formed with a slot extending parallel to the axis of said roller, and means for retaining said layer in position relative to said base during movement of said bottom plate relative to said base, said bottom plate and said roller being movable along said base at the same speed.

References Cited by the Examiner

UNITED STATES PATENTS

| | | | |
|---|---|---|---|
| 1,261,939 | 4/1918 | Johanson | 65—156 |
| 1,916,514 | 7/1933 | Koubek | 240—41.4 |
| 2,316,749 | 4/1943 | Powers | 65—22 |
| 2,601,127 | 7/1952 | Rosenstein | 240—7.35 |
| 2,665,524 | 1/1954 | Brown. | |
| 2,702,411 | 2/1955 | Winstead | 65—106 |

DONALL H. SYLVESTER, *Primary Examiner.*

JULIA E. COINER, *Examiner.*

A. D. KELLOGG, *Assistant Examiner.*